United States Patent [19]
Jenkinson et al.

[11] 3,786,408
[45] Jan. 15, 1974

[54] METHOD AND APPARATUS FOR OFFSHORE GEOPHYSICAL EXPLORATION WITH LOW POWER SEISMIC SOURCE

[75] Inventors: William David Jenkinson; Paul Anthony Bryant Marke, both of Houston, Tex.

[73] Assignee: Texaco Inc., New York, N.Y.

[22] Filed: Jan. 3, 1972

[21] Appl. No.: 214,880

[52] U.S. Cl...... 340/15.5 MC, 340/7 R, 340/15.5 R
[51] Int. Cl. .......................... G01v 1/00, G01v 1/24
[58] Field of Search...................... 340/7 R, 15.5 TD, 340/15.5 MC, 15.5 CP

[56] References Cited
UNITED STATES PATENTS
3,437,989  4/1969  Proffitt............................. 340/7 R
3,517,380  6/1970  Barbier et al. .................... 340/7 R
3,291,141  12/1966  Hines et al. ....................... 340/7 R

*Primary Examiner*—Benjamin A. Borchelt
*Assistant Examiner*—H. A. Birmiel
*Attorney*—Thomas H. Whaley et al.

[57] ABSTRACT

This invention relates to novel methods and apparatus for making offshore geophysical surveys with a low power seismic source. A first vessel, which is provided with air guns or the like, is anchored at a predetermined location, while a second vessel tows a streamer cable along a preselected course past the first vessel. The second vessel transmits command signals to cause the air guns on the first vessel to be fired at appropriate intervals, whereby a sequence of seismic pulses is refracted along a common path on the course, and whereby each of these pulses is detected by succeeding receiver stations of the cable. All of the pulses detected at a common surface point are gathered for each of the various common surface points along the course, and are then stacked to provide a single pulse of greatly improved signal-to-noise ratio for each common surface point. The stacked signals may then be arranged to provide a refraction profile of the course, in order to define traps and the like in subterranean earth formations.

14 Claims, 9 Drawing Figures

METHOD AND APPARATUS FOR OFFSHORE GEOPHYSICAL EXPLORATION WITH LOW POWER SEISMIC SOURCE

BACKGROUND OF INVENTION

This invention relates to geophysical methods and apparatus for investigating the character of subsurface earth formations, and more particularly relates to seismic refraction methods and apparatus for surveying those subterranean formations underlying offshore and other submerged areas.

It is well known to generate a shock at a preselected location in the earth's crust, and to measure various characteristics of the shock waves which are reflected and refracted from subsurface earth strata. From this data is plotted a picture or map of the area which may indicate the presence, if any, of structural traps capable of holding oil and gas. It will be apparent that the amplitude of these waves of interest is a function of the size of the shock, and that a wave of relatively high amplitude is more meaningful and easier to study than is a wave of lesser amplitude. The waves of interest tend to become severely and quickly attenuated as they travel through the water and submerged earth, and thus it is conventional to generate the shock by detonating one or more charges of dynamite or other suitable explosive embedded at predetermined locations in the earth.

Although the basic principles are the same whether the exploration is performed on land or at sea, it will be apparent that offshore operations are complicated by certain problems which are either non-existent or relatively unimportant when dry land exploration is involved. In the first place, the deck of a ship is a relatively unstable platform for performing geophysical exploration, even during mild weather conditions, and this complicates the task of determining the exact locations of the areas being surveyed. Second, the absence of benchmarks and other like indicia, which are available on land, requires the use of complex navigational techniques to determine the geographical location of the surveying vessel and the areas of interest, and the distances which may be involved.

A further problem, however, arises from the recent surge of public interest in those industrial activities suspected of causing damage to the environment. It is a relatively simple matter to detonate a charge of explosive on dry land without causing any ill effect to human or animal life. It cannot be seriously denied, however, that detonation of a charge of dynamite in the ocean often causes some destruction to nearby marine life. Accordingly, it is now a usual practice in marine geophysical exploration to employ air guns and the like which produce only a harmless "pop" of low intensity or amplitude.

It will be apparent, of course, that if the "pop" is of harmless intensity, the acoustic energy waves produced thereby will also have correspondingly low amplitudes, and any electrical signals generated therefrom will have a relatively low signal-to-noise ratio. Accordingly, substitution of these low intensity energy sources for the traditional charge of explosive has had a serious effect on the reliability and accuracy of the data sought to be obtained by geophysical exploration of offshore areas.

When an air gun or other low intensity seismic source is employed on land for these purposes, it is conventional to generate the impulse a number of times while the detectors are maintained at their locations. Accordingly, the electrical signals which are derived from each of these detector locations are then "stacked" so as to produce a single signal having a larger amplitude.

When submerged areas are explored, however, the detectors cannot normally be fixedly located so as to detect a number of shocks of equal significance. Instead, it is conventional to locate the detectors in a streamer cable which extends from the rear of the vessel, and to detect the acoustic waves while the vessel is proceeding along a prescribed course over the area of interest. Accordingly, if the air gun or guns are discharged at preselected intervals, it will be apparent that each wave detected by a particular detector will represent refraction or reflection from or by the strata at a different location, and that "stacking" of the signals from a particular detector or group of detectors in the streamer cable cannot be accomplished by conventional techniques.

These disadvantages of the prior art are overcome with the present invention, however, and improved methods and apparatus are accordingly provided for performing geophysical investigations of subterranean earth formations underlying submerged offshore areas.

SUMMARY OF INVENTION

In an ideal embodiment of the present invention, four air guns or the like acoustic energy sources are interconnected to be repetitively and simultaneously discharged, and are located on a first vessel which is anchored or otherwise fixedly positioned at a first location. A second vessel is then directed along a predetermined course past the first vessel while towing a streamer cable having its geophones or other detectors interconnected in a conventional manner, such as into 24 equal sensing groups each approximately 300 feet long. Of course, six, 12, or more than 24 geophone groups may be used if desired.

Radio navigation methods and equipment such as LORAC may be employed to determine the precise location of the first vessel at each instant the four air guns are actuated. In addition, however, control equipment activated by the LORAC system is preferably included in the two vessels, whereby the air guns suspended from the first or fixed vessel are controlled by commands from the second vessel, and whereby the first vessel transmits notification to the second vessel with each actuation of the air guns.

It will thus be apparent that with the present invention, 24 separate but correlative signals or "traces" can be obtained and "stacked" to provide a greatly enhanced signal for a particular location, in contrast to other marine exploration techniques which can provide only a single trace for any location. On the other hand, it will also be noted that, in contract with prior art techniques suitable only to dry land surveys, each of the 24 separate traces is obtained from a different one of the 24 detector groups or sections of the streamer cable.

Accordingly, it is a feature of the present invention to provide improved geophysical exploration methods and apparatus for surveying offshore subterranean formations.

It is another feature of the present invention to provide improved seismic refraction techniques for investigating subsurface earth formations located in offshore or other submerged areas.

It is also a feature of the present invention to provide novel and improved apparatus and techniques for obtaining "stacked" traces or signals from seismic refraction measurements performed in offshore areas.

It is a further feature of the present invention to provide improved seismic refraction exploration techniques employing non-dynamite shock sources for use in offshore areas.

These and other features and advantages of the present invention will become apparent from the following detailed description, wherein reference is made to the figures in the accompanying drawings.

IN THE DRAWINGS

FIG. 1 is a simplified pictorial representation of two vessels employing seismic refraction equipment to survey the character of subterranean earth strata according to the concept of the present invention.

FIGS. 2A–C are a simplified functional representation, in three separate views, of the production and detection of a sequence of refracted seismic waves according to the concept of the present invention.

FIGS. 3A–C are simplified pictorial representations of a field-type recording of signals generated and detected according to the illustration in FIGS. 1 and 2.

FIGS. 4A–B are simplified pictorial representations of the first step performed in gathering the data illustrated in FIG. 3.

DETAILED DESCRIPTION

Figure 1:
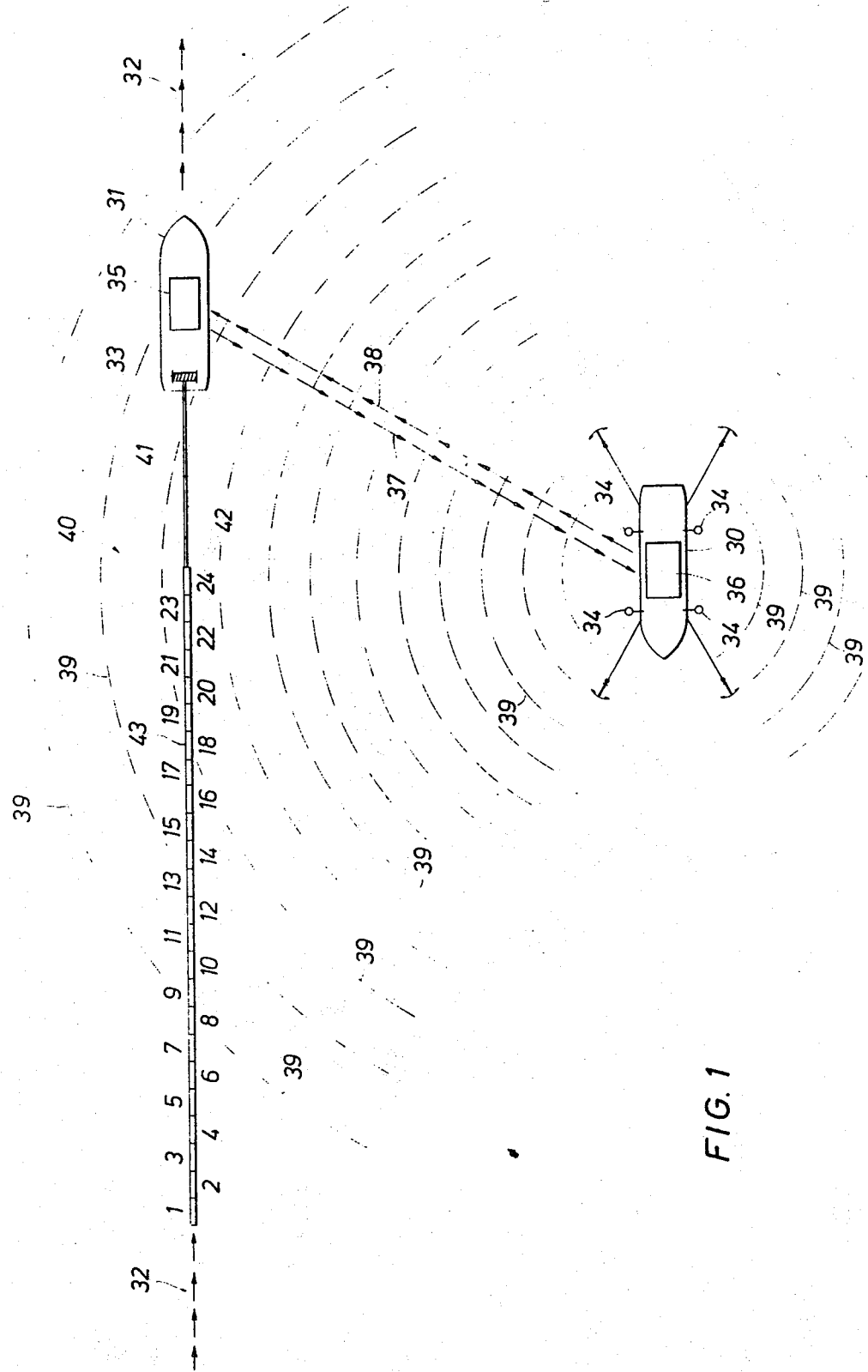

Referring now to FIG. 1, there may be seen a simplified pictorial representation of an exemplary embodiment of methods and apparatus for performing seismic refraction surveys of submerged lands in accordance with the concepts of the present invention. More particularly, a transmitting vessel 30 is anchored or otherwise fixedly positioned at a first preselected location within the area sought to be investigated, while a second or receiving vessel 31 is caused to proceed along a pre-defined course 32 through the area and past the transmitting vessel 30. As suggested in FIG. 1, the purpose of the transmitting vessel 30 is to provide a source of seismic or acoustic energy impulses, which are refracted by one or more subterranean strata at predetermined locations along the course 32, and which are thereafter detected, measured and recorded by the receiving vessel 31. Accordingly, the transmitting vessel 30 may be provided with four acoustic energy sources, such as air guns 34 (or the like) which may be suspended in the water from davits on the transmitting vessel 30, and which may be actuated or " fired" to produce a series of seismic waves 39 as indicated.

The receiving vessel 31 is preferably adapted to tow a streamer cable 40 for detecting these seismic impulses 39 at predetermined locations along the course 32. Accordingly, the receiving vessel 31 may be provided with a conventional reel 33 or other suitable mounting means which is preferably mounted on the stern of the vessel 31 as indicated in FIG. 1. The streamer cable 40 may be of any conventional design, and may thus be composed of a lead-in portion 41 of about 500 feet in length, a stretch section or portion 42 of about 400 feet in length, followed by a receiving or seismic sensing portion 43 composed of a plurality of geophones or the like and arranged in a sequence of twenty-four separate receiver sections 1–24. More particularly, each of the receiver sections 1–24 contains twenty geophones (not depicted) preferably connected in parallel to provide the receiving vessel 31 with a single input signal for each detected impulse 39. Each of the receiver sections 1–24 are separately interconnected, however, so that each receiver section generates a separate indication of the arrival of an acoustic impulse 39. Accordingly, it will be apparent that each of the 24 receiver sections 1–24 will provide an indication of the effect of the subterranean strata on the acoustic energy waves or impulses 39 at 24 different locations along the course 32.

As previously stated, the receiving vessel 31 is preferably provided with accurate radio-navigation equipment (not depicted) such as LORAC or the like. In addition, other command and signal processing equipment 35 is also provided aboard the receiving vessel, for generating electronic or electromagnetic command signals 37 to the transmitting vessel 30 in conjunction with the location determinations made by the LORAC, and for receiving and processing signals from the receiver sections 1–24 of the streamer cable 40 as will hereinafter be explained.

Accordingly, the transmitting vessel 30 is preferably equipped with suitable actuating equipment 36 of conventional design, for actuating or firing the air guns 34 in response to each command signal 37 from the receiving vessel 31, and also for providing notification signals 38 in reply for the purpose of announcing the instant when each impulse 39 is generated. Thus, the command and processing equipment 35 preferably includes suitable means for receiving and noting each notification signal 38 in conjunction with detection of impulses 39 by the receiver sections 1–24 of the streamer cable 40. Since each of the receiver sections 1–24 is positioned at a different respective location along the course 32 for each impulse 39, the LORAC (not depicted) is also preferably interconnected with the command and processing equipment 35 for correlating the firing of the air guns 34 with the locations of the receiver sections 1–24 of the cable 40.

Figure 2A:
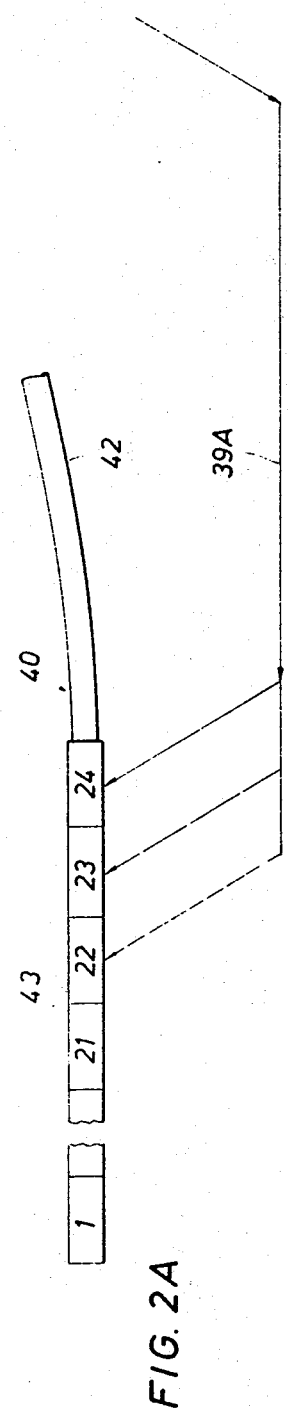

Referring now to FIG. 2, there may be seen a functional illustration of the detection of different seismic pulses 39 by the streamer cable 40 as it is towed along the pre-defined course 32 by the receiving vessel 31. Referring in particular to FIG. 2A, it will be seen that as the cable 40 is towed along the course 32, each of the receiver sections 1–24 progresses along the various locations sought to be surveyed. The transmitting vessel 30 is anchored, however, as depicted in FIG. 1. Thus, each of the various seismic pulses 39 produced by the air guns 34 will be refracted from the same fixed locations along the course 32.

Figure 2B:
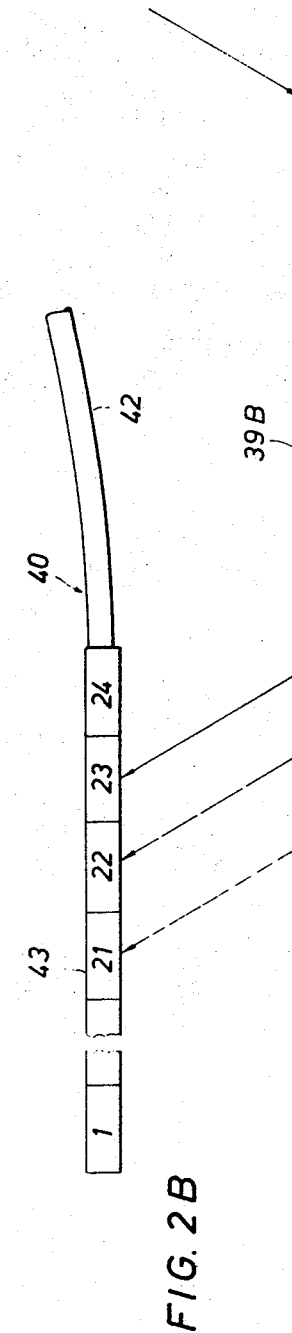

Accordingly, when a first shot of a sequence is generated by the air guns 34, the seismic pulse 39A of FIGS. 2A produced by the first shot will travel down to the subterranean refractor where it will be refracted and thereafter detected by each of the several receiver sections 1–24. The cable 40 is moving, however, as indicated by FIGS. 2A and 2B. Thus, receiver section 23 will thereafter be towed to the same location which was surveyed by receiver section 24 as a function of the first shot when the second shot 39B of FIG. 2B is generated.

The first seismic pulse 39A will have traveled past the cable 40 by the time the receiver section 23 reaches the location which was occupied by the receiver section 24 when the first seismic pulse 39A was detected. Accordingly, the air guns 34 are caused to fire the second shot, and thus the receiver section 23 will detect the second seismic pulse 39B at the same location which receiver section 24 was in when it received the first shot impulse 39A.

Figure 2C:
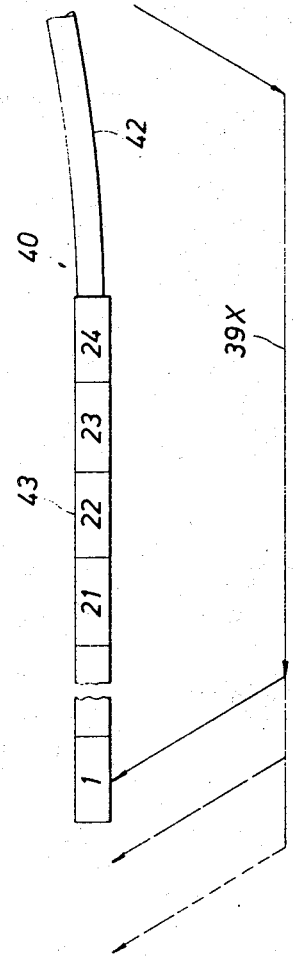

As indicated in FIG. 2C, the streamer cable 40 continues to move without interruption along the course 32. Accordingly, the last receiver section 1 in the cable 40 will eventually move to the location originally occupied by the receiver section 24 when the first seismic pulse 39A was detected. When this point is reached by receiver section 1 as indicated in FIG. 2C, the air guns 34 will be caused to fire the 24th shot in the sequence. Thus, the last receiver section 1 will detect the 24th seismic pulse 39X at this same geographical location. It will be appreciated that in this manner 24 redundant seismic energy shots which have travelled over the same acoustic path reach each of the receiver sections 1-24 as they pass over this location.

Figure 3A:
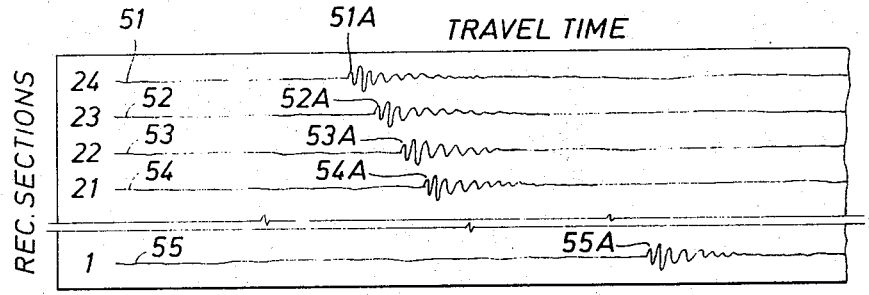
Figure 3B:
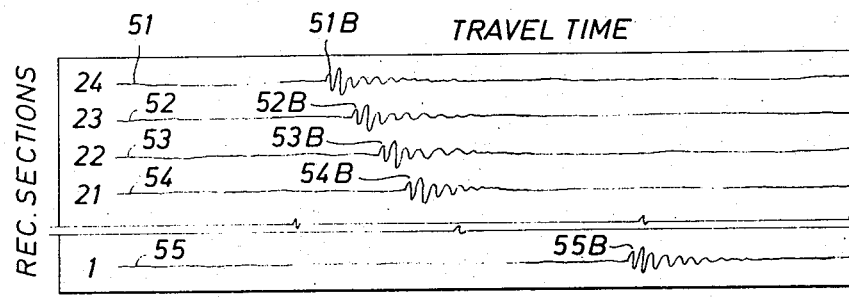

Referring now to FIG. 3, there may be seen a simplified graphical representation of the signals which may be provided by the receiver sections 1-24 in response to various ones of the seismic impulses 39. More particularly, FIG. 3A is an illustration of the signals provided by each of the receiver sections 1-24 in response to the first seismic pulse 39A, and FIG. 3B is a similar illustration of signals provided in response to second seismic pulse 39B which is generated by the air guns 34. As hereinbefore explained, it is contemplated that in an ideal embodiment of the present invention, the air guns 34 will be fired in each data gathering sequence the same number of times as there are receiver sections in the streamer cable 40. Accordingly, FIG. 3A is a comparable illustration of the signals which are generated by the 24 receiver sections 1-24 in response to the 24th or last seismic pulse 39X in the shot series which is related to the location occupied by the initial receiver section 24 when it detected the first seismic impulse 39A.

Referring now to FIG. 3A in particular, it will be noted that the traces 51-54 represent, respectively, the outputs from the leading four receiver sections 24-21 of the streamer cable 40, and that trace 55 represents the output of the last receiver section 1 of the cable 40. Accordingly, the first amplitude peak or "blip" in each of these traces 51-55 corresponds to the arrival of the first seismic impulse 39A in the series. In other words, blip 51 represents the arrival of the seismic pulse 39A at the leading receiver section 24, blip 52A represents the arrival of the same first seismic pulse 39A at the next succeeding receiver section 23, and blips 53A and 54A are produced by detection of the first seismic pulse 39A by the immediately following receiver sections 22 and 21, respectively. The intervening traces between trace 21 and trace 1 have been omitted for simplification. Thus blip 55A represents the detection of the first seismic pulse 39A in the series by the trailing receiver section 1.

The purpose of the present invention is to measure the depth of a subterranean formation by a function of its refraction index. Accordingly, the lateral position of the blip 51A in the trace 51 from the leading receiver section 24 is an indication of the travel time of the first seismic impulse 39A from the first vessel 30 to the location then occupied by the leading receiver section 24. The travel time of the seismic impulse 39A through the water can be predetermined. Accordingly, any additional travel time is a function of the refraction index of the formation of interest and its depth.

It will be noted that in FIG. 3A, the travel time of the first pulse 39A to the second receiver section 23 is depicted as slightly greater than the travel time of the first pulse 39A to the leading receiver section 24. This, of course, indicates that the location of second receiver section 23 is spaced a greater distance from the first vessel 30 at the moment the air guns 35 fire the first seismic pulse 39A in the series. The arrival time of blip 55A received by the trailing or lattermost receiver section 1 of streamer 40 is indicative of the length of the streamer 40 (each of 24 receiver sections 1-24 being approximately 300 feet long). The relative arrival time of blips 51A-55A also indicate that when the first seismic pulse 39A was generated the second vessel 31 was proceeding generally toward the first vessel 30 along the course 32.

Referring now to FIG. 3B, there may be seen a representative illustration of the arrival of the second seismic impulse 39B at each of the receiver sections 1-24 in the streamer cable 40. During the time lapse between the first and second firings of the air guns 36, however, the second vessel 31 has progressed approximately 300 feet along the course 32. In this position the first or leading receiver section 24 is closer to the first vessel 30 than when shot 1 was fired as indicated by the fact that the arrival time of pulse 39B at receiver 24 is earlier than that of the first seismic pulse 39A. The next succeeding receiver section 23 in the cable 40 is now at the location previously occupied by the leading receiver section 24, however, as indicated by the time alignment of the blip 52B with blip 51A in FIG. 3A. Similarly, blip 53B is aligned in arrival time with blip 52A, and blip 54B is now aligned with blip 53A, to indicate that the third and fourth receiver sections 22 and 21 have been moved to the locations formerly occupied by the second and third receiver sections 23 and 22, respectively. Additionally, blip 55B provided by the trailing receiver 1 has now arrived somewhat sooner with respect to blip 55A, which indicates that the trailing receiver 1 has been towed closer to the stationary vessel 30 along the course 32 by the second vessel 31.

Figure 3C:
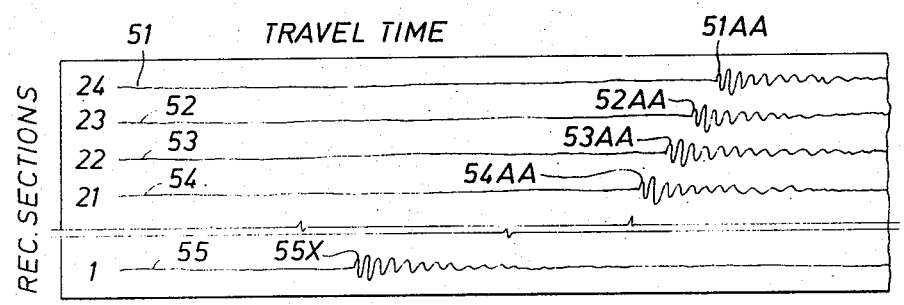

Referring now to FIG. 3C, there may be seen a similar graphical illustration of the arrival of the 24th seismic impulse 39X at the receiver sections 1-24 of the streamer cable 40. It may be noted that the blip 55X is aligned in travel time with blips 51A and 52B. This indicates that the air guns 36 have been correctly actuated by the command signal 37 so that the 24th seismic impulse 39X of the sequence reaches the last receiver section 1 just as the last receiver section 1 occupies the location formerly occupied by the leading receiver section 24 when the first seismic pulse 39A was detected by the streamer cable 40.

it should be clearly understood that the air guns 36 need not be silenced merely because they have fired on series or sequence of shots corresponding to the number of receiver sections included in the streamer cable 40. Instead, it is within the concept of the present invention to continue to fire the air guns 36 as long as intelligible blips can be derived from the receiver sections 1–24, and as long as the second vessel proceeds along the course 32 whereby the location of each of the receiver sections 1–24 can be determined with with accuracy by the LORAC navigation equipment. Accordingly, the second, third or subsequent shots of a series of shots may, for present purposes, be interpreted as the first or subsequent shot of another sequence for a different receiver location. Referring again to FIG. 3C, therefore, there may be seen additional blips 51AA-54AA which indicate detection of shot 39X arriving at the streamer cable 40 after the receiver sections 24–21 have been towed to different locations of interest along the course 32.

As hereinbefore explained, it is desired to "stack" the various pulses which relate to common refraction points or locations along the course 32. Before this can be effectively accomplished, however, it is desirable to "gather" the blips provided by the receiver sections 1–24 with respect to the various sesmic impulses 39.

Figure 4A:
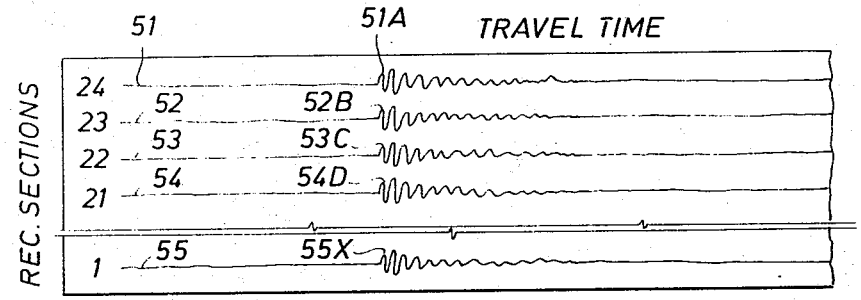

Referring therefore to FIG. 4A, there may be seen a graphical illustration of an assembly of seismic traces received by the streamer cable 40 as a result of the refraction of a series of twenty-four different seismic impulses 39A-X by the same acoustic path, as the cable 40 for progressed along the course 32. Accordingly, all of the depicted blips are in alignment (are nearly so) with respect to travel time, since all of the blips represent the refraction of seismic energy along the same path. However, the blip 51A was derived by the leading receiver section 24 in response to the first seismic pulse 39A in the shot series, and blip 52B was generated by the next or second receiver section 23 in response to the second seismic pulse 39B in the series.

As hereinbefore stated, the air guns 36 may continue to be discharged to provide other and further series of seismic impulses. Furthermore, it should be understood that it is desired to derive and "stack" the traces derived from each of the various 300-foot locations of interest along the course 32. Accordingly, it should be appreciated that although the seismic impulse 39B which is received by the second receiver section 23 as it moves to the location previously vacated by the leading receiver section 24, this impulse 39B, which is the second in the series relating to the location now occupied by the second receiver section 23, is also received by the leading receiver section 24 in its new location. Thus, the seismic impulse 39B which is the second of a series of 24 impulses 39 relating to the location previously occupied by the leading receiver section 24, is now the first impulse 39AA in a different series of 24 impulses 39 refracted and detected with respect to this new or next succeeding location along the course 32.

Figure 4B:
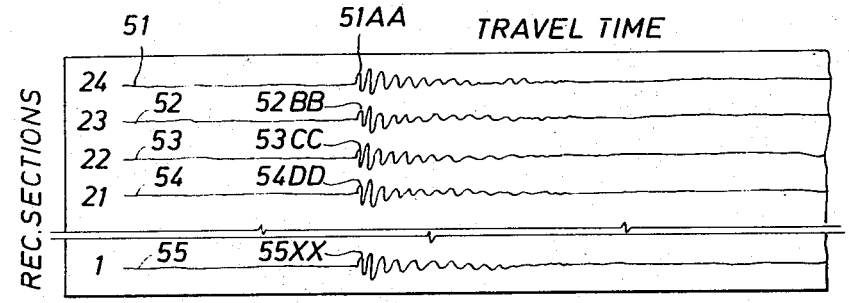

Referring now to FIG. 4B, therefore, there may be seen a simplified graphical representation of the various traces generated by the twenty-four receiver sections 1–24 with respect to this next succeeding location, the earlier arrivals indicating that this location was nearer the stationary vessel of FIG. 1. As may be seen, blip 51AA was derived by the leading receiver section 24 in response to the receipt of the first seismic impulse 39AA in a new series of 24 shots relating to the new location then occupied by the leading receiver section 24. It should be noted, however, that this first impulse 39AA of the new series, is also the second impulse 39B of the previously described series insofar as the previous location is concerned. Similarly, blip 52BB represents the detection by the second receiver section 23 of the second impulse 39BB in the new series, which is also the third impulse 39C in the previous series.

Referring again to FIG. 4B, it will be noted that blips 53CC and 54DD are derived from the detection of the third and fourth impulses 39CC and 39DD, respectively, by the third and fourth receiver sections 22 and 21, and that blip 55XX is derived from the last receiver section 1 in the streamer cable 40 in response to the 24th impulse 39XX in the new or second series. As hereinbefore noted, the third and fourth impulses 39CC and 39DD in this second series, correspond to the fourth and fifth impulses 39D and 39E in the first series. The distinction between the first and second series of pulses 39 will be apparent from the relative alignments of the blips in FIGS. 4A and 4B, however, in that the impulses 39A-X constituting the first series of 24 impulses 39, all relate to the first location or common surface point on the course 32, whereas the impulses 39AA-XX constituting the second series all relate to the next succeeding 300-foot location or common surface point on the course 32. Such trace gatherings as shown in FIGS. 4A and 4B may be derived in a similar manner for all such common surface points on the course 32.

After the various signals provided by the streamer cable 40 have been gathered as illustrated in FIGS. 4A and 4B, they may be added together and normalized, or "stacked" to provide one single enhanced trace for each of the various common surface locations or common refraction paths associated therewith. These stacked traces may then be arranged to provide a refraction "profile" of the course 32. Since the technique for stacking the traces and obtaining the profile is conventional, it need not be described in detail. It should be noted, however, that each trace depicted in FIGS. 3 and 4 represents both a coherent seismic signal and incoherent noise. The purpose of stacking traces obtained by the detection of a series of seismic pulses 39 from a common refraction point, is to obtain a trace in which the signal-to-noise ratio is greatly enhanced. The noise in each of the 24 gathered traces will, to a great extent, tend to cancel itself in the stacking. It can be shown statistically that this can provide an improvement in the signal-to-noise ratio by a factor equal to the square root of the number of traces being stacked.

As hereinbefore stated, it is desirable to provide LORAC or other suitable radio navigation equipment aboard the towing vessel 31 for the purpose of correlating the location of the various common surface points on the course 32 with the actuating signals 37 sent to fire the air guns 36. It has been found especially convenient to provide similar LORAC equipment aboard the transmitting vessel 30, whereby calculations of relative range between the two vessels 30 and 31 may be obtained for each common surface point of interest. However, it is also convenient to compute the water break arrival times at preselected locations along the streamer cable 40, and to establish the relative ranges between the transmitting vessel 30 and each common refraction point by using a factor corresponding to measured sea water velocity.

Referring again to FIG. 1, it will be noted that although the transmitting vessel 30 is illustrated as having four air guns 36, it will also be noted that any number of seismic sources may be provided within the concept of the present invention, if all sources are discharged in unison or synchronism to provide against generation of disorganized seismic impulses 39. However, in one application of the present invention, excellent results were obtained with a seismic energy source composed of four 120 cubic inch air guns suspended approximately 50 feet below sea level.

Referring again to the various traces 51–55 depicted in FIGS. 3 and 4, it will be noted that each seismic impulse 39 which is detected is a complex assembly of various reverberations. It is usually preferable to employ the first portion of these impulses 39, which is the first blip in the trace, for the purpose of determining the range to the common refraction point of interest, since this first portion of the signal is usually the most dependable for this purpose. It is within the concept of the present invention to employ secondary refracted arrivals, however, when these portions of the signal can be identified and picked.

Various other modifications and alternatives will be apparent which will be within the scope of the present invention. Accordingly, it should be clearly understood that the methods and structures hereinbefore described and illustrated in the accompanying drawings are exemplary only and are not intended as limitations on the scope of the invention.

What is claimed is:

1. A method of making geophysical measurements in a submerged offshore area, comprising
    defining a preselected course of travel through at least one predetermined surface point in said area,
    establishing a source of seismic energy at a preselected geographically fixed source location in said area,
    towing a plurality of seismic sensors in trailing arrangement along said course whereby each of said sensors is towed to and through said surface point,
    generating seismic energy at said source location as each of said sensors reaches said surface point,
    deriving from each of said sensors a signal representative of the magnitude of the seismic energy arriving at said surface point, and
    collecting and stacking said signals into a single signal representative of a summation of the seismic energy arriving at said surface point.

2. A method of making geophysical measurements in a submerged offshore area, comprising
    towing a plurality of seismic sensors trailingly to and through a predetermined surface point in said offshore area,
    generating seismic energy at a preselected geographically fixed source location according to the arrival of each of said sensors at said surface point,
    deriving from each of said sensors a signal representative of a characteristic of the seismic energy arriving at said surface point, and
    combining said signals into a recordable function of the sum of the seismic energy received by said sensors at said surface point.

3. The method described in claim 2, wherein said combining step includes
    collecting said signals derived by each of said sensors and characteristic of the seismic energy arriving at said surface point, and
    stacking said collected signals into a single signal substantially representative of a summation of the seismic energy arriving at said surface point in substantial coincidence with the arrival of said sensors at said surface point.

4. The method described in claim 3, further comprising
    defining a course of travel through said predetermined surface point,
    towing said plurality of sensors along said course and sequentially through said surface point, and
    generating seismic energy at said source location in relationship with the arrival of each of said plurality of sensors at said surface point.

5. The method described in claim 4, further comprising
    determining the location of each of said sensors at said surface point,
    generating a discrete burst of seismic energy at said source location in time dependent relationship to the arrival of each of said sensors at said surface point, and
    deriving from each of said sensors a signal functionally related to the arrival of one of said bursts of seismic energy at said surface point.

6. The method described in claim 5, further including
    generating a plurality of command signals in time dependent relationship to the arrival of each of said sensors at said surface point,
    generating a corresponding plurality of discrete bursts of seismic energy in response to said command signals, and
    generating a notification signal announcing the occurrence of each of said bursts of seismic energy.

7. The method described in claim 6, wherein said command signals are generated at predetermined locations along said course and wherein said notification signals are generated at said source location.

8. A method of making geophysical measurements in a submerged offshore area, comprising
    towing a plurality of seismic sensors to and through at least one predetermined surface point on a preselected course of travel through said area,
    generating at a preselected geographically fixed source location in said area a plurality of discrete bursts of seismic energy in time dependent correlation with the arrivals of said sensors at said surface point on said course,
    deriving from said sensors a corresponding plurality of signals each characteristic of the arrival of one of said bursts of seismic energy at said surface point, and
    collecting and stacking said signals into a single recordable representation of a summation of the seismic energy arriving at said surface location.

9. The method described in claim 8, further comprising determining the arrival of each of said sensors at said surface point,
    generating a command signal in time dependent relationship to said determination of arrival, generating each of said plurality of discrete bursts in response to a command signal, and generating a corresponding plurality of notification signals for announcing each of said bursts.

10. A method of making geophysical measurements in a submerged offshore area, comprising towing a plurality of seismic sensors trailingly to and sequentially through first and second predetermined surface points on a course of travel through said area, generating a plurality of discrete bursts of seismic energy at a preselected geographically fixed source location in said area in time dependent relationship to the arrival of said sensors at said surface points, deriving from each of said sensors a first signal characteristic of seismic energy arriving at said surface point and a second signal characteristic of seismic energy arriving at said second surface point, collecting said first signals into a first functionally related group and said second signals into a second functionally related group, stacking said first group of collected signals to provide a single enhanced signal substantially representative of a summation of the seismic energy received by said sensors at said first surface point, and stacking said second group of collected signals to provide a single enhanced signal substantially representative of a summation of the seismic energy received by said sensors at said second surface point.

11. The method described in claim 10, further comprising determining the arrivals of said sensors at each of said surface points on said course, generating a plurality of command signals in time dependent relationship to said arrivals of said sensors at said surface points, generating each of said bursts of seismic energy in response to one of said command signals, and generating a corresponding plurality of notification signals for announcing the occurrence of said bursts at said source location.

12. The method described in claim 11, wherein said command signals are generated at a location on said course of travel and said notification signals are generated at said source location.

13. A system for making geophysical measurements in a submerged offshore area, comprising a streamer cable composed of a plurality of receiver sections, towing means for towing said streamer cable along a preselected course of travel and to and through at least one preselected surface point in said area, a source of seismic energy fixedly positioned at a predetermined geographically fixed source location in said area, signalling means for actuating said energy source in time dependent relationship to the arrival of said receiver sections at said surface point and for deriving from said receiver sections signals representative of seismic energy arriving at said surface point from said source location, and means for collecting and stacking said signals into a single signal representative of a summation of the seismic energy received by said receiver sections at said surface location.

14. The system described in claim 13, wherein said signalling means further comprises control means interconnected with said towing means for determining the arrival of said receiver sections of said cable at said surface point and for generating command signals in correlation therewith, and actuating means located at said source location and responsive to said command signals for actuating said source of seismic energy and for generating a notification signal in functional relationship to each such actuation.

* * * * *